Patented Dec. 7, 1937

2,101,828

UNITED STATES PATENT OFFICE 2,101,828

VAT DYE COMPOSITION

Harold W. Wass and Howard J. Rupright, Midland, Mich., assignors to The Dow Chemical Company, Midland, Mich., a corporation of Michigan No Drawing. Application August 5, 1935, Serial No. 34,723

20 Claims. (Cl. 8—6)

This invention concerns certain improved vat dye compositions, particularly aqueous pastes containing vat dyes of the thioindigoid type, which give superior results when employed in dye printing.

Vat dyes are usually marketed in the form of aqueous dye pastes. When intended for use in printing, such paste may also contain various other agents, e. g. a wetting agent such as glycerine, glycol, or other polyhydric alcohol; a dispersing agent such as an alkyl sulphuric acid, an organic sulphonic acid or condensation product thereof with a phenol or aldehyde; etc. A number of dispersing agents of the types just mentioned are marketed under the trade names Nekal, Barretan, Sorbinol, Super Spruce Extract, Gardinol, Igepan, Tamol, etc.

In printing, the dyer incorporates such dye paste with a printing gum consisting, for example, of a mixture of glycerine, a thickening agent such as starch, dextrine, British gum or gum tragacanth, an alkali such as sodium or potassium carbonate, and a reducing agent such as a formaldehyde-sodium hydrosulphite condensation product, to obtain the printing composition which is applied to a fabric. To develop the print the printed fabric is steamed, whereby the dye becomes reduced and fixed on the fabric, after which the latter is treated with an oxidizing agent to reoxidize the dye, and the printed material is then washed thoroughly to remove excess dye and printing gum. In such printing process, only a portion of the dye applied to a fabric becomes fixed thereon, the remainder being washed away and lost during the operations of developing and washing the printed material. Accordingly, to obtain a print of given weight, the dye is always applied to a fabric in concentration greater than would be required if all of the applied dye were retained by the fabric.

An object of the present invention is to provide an improved vat dye paste, suitable for use in a printing composition, and process whereby the weight of print obtainable by applying a dye in given concentration may be increased, and, as a corollary, whereby the concentration of dye required to produce a print of given weight may be reduced.

We have discovered that the foregoing object is attained by incorporating with an aqueous dye paste an alcohol containing a hydrobenzene radical, or an ester of such alcohol. An alcohol of the type referred to may contain the hydroxyl group as a nuclear substituent on the hydrobenzene radical or as a substituent on a hydrocarbon group linked with said radical. For sake of simplicity in naming such type of alcohol, it is hereinafter referred to as a "hydrobenzene alcohol".

Although any hydrobenzene alcohol or ester thereof may be employed to increase the weight of print obtainable from a dye paste of given concentration, we have found that the hydrobenzene alcohols having the empirical formula $C_nH_{2n-y}O$, wherein $n$ is an integer greater than 5 and $y$ is 0 or 2, and the fatty acid esters of such alcohols, are particularly effective in this respect. Among the various alcohols and esters which may be employed for the purpose just mentioned are terpineol, cyclohexanol, methyl cyclohexanols, ethyl cyclohexanols, isopropyl cyclohexanols, cyclohexyl-isopropanol, cyclohexanone (which is known to exist in the tautomeric form of the alcohol, Δ-tetrahydro-phenol) and the acetates, propionates, and other esters of each of said alcohols. Instead of a pure alcohol or ester, a natural mixture containing the same, e. g. pine oil, may be used.

When such improved dye paste, containing a hydrobenzene alcohol or ester, is mixed with printing gum and applied to a fabric in the usual manner, a print of greater weight may be obtained than when a dye paste of otherwise identical composition, but not containing said alcohol or ester, is similarly employed. Apparently, when employed in such manner, the hydrobenzene alcohol or ester promotes fixation of the dye on a fabric. Such action of the alcohol or ester in increasing the weight of print from a vat dye is particularly pronounced in the case of vat dyes of the thioindigoid series. The invention, then, consists in the improved vat dye pastes as well as printing compositions hereinafter fully described and particularly pointed out in the claims.

According to the invention, a hydrobenzene alcohol or ester thereof is mixed with an aqueous paste containing a thioindigoid vat dye in finely divided condition, e. g. a dye paste such as is obtained directly in the manufacture of vat dyes by usual methods. The dye paste to which such alcohol or ester is added may contain a wetting agent such as glycol, glycerine, or other polyhydric alcohol and a dispersing agent such as one of those hereinbefore mentioned, but the invention does not depend upon the presence of such agents.

The improved dye paste so prepared may be incorporated in a printing gum and the resultant printing compositions applied to, and developed on, a fabric in accordance with usual printing procedure.

By incorporating a thioindigoid vat dye paste containing a hydrobenzene alcohol or ester in a printing composition as described above, a print of greater weight may be obtained than in the absence of such alcohol or ester. However, to obtain such beneficial action, the alcohol or ester must be added to the dye paste prior to incorporating the latter with the printing gum. When added to the printing gum instead of the dye paste, or when added to the printing composition after incorporation of the dye paste with the printing gum, such alcohol or ester displays little, if any, effect in increasing the weight of the print. Apparently, the ingredients, such as starch or dextrine, commonly present in a printing gum reduce the beneficial action of the alcohol or ester if present at the time the alcohol or ester is added.

The following examples illustrate the beneficial action of hydrobenzene alcohols and esters in a thioindigoid dye paste for increasing the weight of dye prints made therefrom, but are not to be construed as limiting the invention.

Example 1

Four comparative experiments were carried out as follows:

(a) One part by weight of an aqueous dye paste, containing 24.5 per cent by weight of the dye 5.5'-dichloro-7.7'-dimethyl-thioindigo, 50 per cent of glycerine, and about 1 per cent of the dispersing agent Tamol, but containing no hydrobenzene alcohol or ester of such alcohol, was incorporated with 20 parts by weight of a printing gum containing approximately 28 per cent by weight of water, 25 per cent of British gum, 20 per cent of formaldehyde-sodium hydrosulphite, 10 per cent of potassium carbonate, and 7 per cent of glycerine. The resultant composition was applied to a cotton fabric in the usual manner on a printing machine, after which the fabric was successively steamed, treated with an aqueous solution of sodium chromate and acetic acid, washed in a boiling soap solution, washed with water, and ironed. This print, obtained without using a hydrobenzene alcohol or ester thereof, was employed as a standard in judging the weight of other prints from similar printing compositions to which pine oil, rich in terpineol, had been added.

(b) A printing composition was prepared by incorporating the same aqueous paste of 5.5'-dichloro-7.7'-dimethyl-thioindigo with a printing gum exactly as described in the above experiment (a). 0.2 part by weight of pine oil, containing about 80 per cent by weight of terpineol, was then incorporated in the printing composition, after which the latter was employed in printing a cotton fabric as in experiment (a). The print was of same weight as that obtained in experiment (a), illustrating the fact that pine oil is ineffectual when added to a printing composition consisting of a mixture of dye paste and printing gum.

(c) A printing composition was prepared and employed as in experiment (a), except that 0.2 part of pine oil was added to the printing gum prior to incorporating the dye paste therewith. The print produced by the composition was of the same weight as in experiment (a), showing that pine oil is ineffectual when added in such manner.

(d) A printing composition was prepared and employed as in experiment (a), except that 0.2 part of pine oil was mixed with the dye paste prior to incorporating the latter with the printing gum. The print produced from this composition was much heavier than those produced in experiments (a), (b), and (c).

Example 2

The following experiments were carried out for the purpose of illustrating the fact that by incorporating pine oil in a dye paste as hereinbefore described, the so-treated paste may be employed in a printing composition to give a print of weight equal to that obtainable under like conditions from a paste containing a considerably greater concentration of the dye but no pine oil:

(a) In this experiment, 1 part by weight of an aqueous dye paste containing 26 per cent by weight of the dye 2-thionaphthen-2'-acenaphthalene-indigo (Colour Index No. 1228) was incorporated with 20 parts by weight of the printing gum employed in Example 1. The resultant printing composition was applied to, and developed on, a cotton fabric in the usual manner. This print was employed as a standard in judging the weight of the prints obtained using pastes of the same dye which contained pine oil.

(b) One part by weight of an aqueous dye paste containing 23 per cent by weight of 2-thionaphthen-2'-acenaphthylene-indigo, 5 per cent of glycerine and 15 per cent of pine oil was incorporated with 20 parts of a printing gum and the resultant composition was employed in printing a fabric as in the above experiment (a). The print obtained from the 23 per cent dye paste was of the same weight as that obtained from the 26 per cent dye paste in experiment (a).

(c) A printing composition was prepared and employed as in the above experiment (b), except that the dye paste contained 15 per cent by weight, instead of 5 per cent, of glycerine. The print obtained was of the same weight as in experiments (a) and (b), showing that a change in glycerine content of a dye paste does not change greatly the weight of print obtained from such paste.

Example 3

The following table describes a series of experiments illustrating the change in weight of a print which may be obtained by varying the proportions of dye and pine oil in the dye paste employed in making such print. In each experiment, 1 part by weight of an aqueous dye paste containing the dye 5.5'-dichloro-7.7'-dimethyl-thioindigo in the concentration stated in the table was treated with the quantity of pine oil stated, and the so-treated paste was incorporated with 20 parts by weight of a printing gum of the same composition as that employed in Example 1. The resultant composition was applied to and developed on a cotton fabric in accordance with usual printing procedure. The table states the relative weights of prints obtained in this series of experiments.

| Experiment | Percent by weight of dye in dye paste | Parts by weight of pine oil | Weight of print |
|---|---|---|---|
| (a) | 24.5 | ---- | Standard |
| (b) | 21.5 | 0.03 | Same as (a) |
| (c) | 23.5 | 0.03 | Much heavier than (a) |
| (d) | 21.5 | 0.06 | Much heavier than (a)—same as (c) |
| (e) | 23.5 | 0.06 | Heavier than (a)—(d) |
| (f) | 21.5 | 0.12 | Heavier than (a)—(e) |
| (g) | 21.5 | 0.20 | About same as (f) |

In the above table, a comparison between experiments (a) and (b) shows that by incorporating only 0.03 part by weight of pine oil in 1 part of a dye paste containing 21.5 per cent by weight of the dye, the resultant paste gave a print of the same weight as was obtained from a paste containing 24.5 per cent of the dye, but no pine oil. Experiments (c)—(g) illustrate the changes in weight of print that may be obtained by changing the proportions of vat dye and pine oil in improved dye pastes of the present type. In experiment (d) it will be noted that a paste containing 21.5 per cent of a dye and approximately 6 per cent of pine oil gave a much heavier print than did the dye paste employed in experiment (a) which contained 24.5 per cent of the dye, but no pine oil. A comparison of experiment (f) with experiment (g) shows that the dye paste treated with 0.12 part of pine oil gave nearly as heavy a print as did the paste treated with 0.20 part of said oil. In general we have found that the weight of print from a given paste becomes greater as the proportion of pine oil in the paste is increased to about 15 per cent by weight, but that a further increase in proportion of pine oil produces little additional effect. Accordingly, we find it most economical to employ the pine oil in a proportion not exceeding 15 per cent the weight of a dye paste, but said oil may be employed in larger proportion if desired.

Although pine oil, which is rich in terpineol, was employed in each of the above examples for the purpose of illustrating the manner in which the invention is to be applied and the improved weight of dye prints obtainable thereby, we have produced similar increases in weight of prints from thioindigoid vat dyes by incorporating with the dye pastes the following hydrobenzene alcohols and esters:—terpineol, terpineol acetate, cyclohexanol, cyclohexyl acetate, 2-methyl-cyclohexanol, 3-methyl-cyclohexanol, 4-methyl-cyclohexanol, 3-methyl-cyclohexyl acetate, and 4-methyl-cyclohexyl acetate. In each instance, the alcohol or ester was first mixed with a dye paste, the so-treated paste was incorporated with a printing gum, and the resultant composition was employed to print a fabric in the usual manner. Still other hydrobenzene alcohols and esters, e. g. ethyl-cyclohexanol, ethyl-cyclohexyl propionate, isopropyl-cyclohexanol, isopropyl-cyclohexyl butyrate, etc., may be employed in similar manner to increase the weight of print from a dye paste.

Hydrobenzene alcohols and their esters may likewise be employed to increase the weight of prints obtainable from other thioindigoid vat dyes such as 2(5.7-dibromoindole)-5'-bromo-2'-thionaphthen-indigo (Color Index No. 1222), 6.6'-diethoxy-2.2'-bis-thionaphthen-indigo (Color Index No. 1217), 4.4'-dimethyl-6.6'-dichloro-bis-thionaphthen-indigo, etc.

Other modes of applying the principle of our invention may be employed instead of those explained, change being made as regards the materials employed, provided the ingredients stated by any of the following claims or the equivalent of such stated ingredients be employed.

We therefore particularly point out and distinctly claim as our invention:—

1. A dye paste comprising a thioindigoid vat dye and a hydrobenzene compound selected from the class consisting of hydrobenzene alcohols and their esters to which paste a printing gum is to be added to obtain a composition useful in printing cellulose fibers.

2. A dye paste comprising a thioindigoid vat dye and a hydrobenzene alcohol having the empirical formula $C_nH_{2n-y}O$ wherein $n$ is an integer greater than 5 and $y$ is zero or 2 to which paste a printing gum is to be added to obtain a composition useful in printing cellulose fibers.

3. A dye paste comprising a thioindigoid vat dye and an ester of a hydrobenzene alcohol having the empirical formula $C_nH_{2n-y}O$ wherein $n$ is an integer greater than 5 and $y$ is zero or 2 to which paste a printing gum is to be added to obtain a composition useful in printing cellulose fibers.

4. A dye paste comprising 5.5'-dichloro-7.7'-dimethyl thioindigo and a hydrobenzene compound selected from the class consisting of hydrobenzene alcohols and their esters to which paste a printing gum is to be added to obtain a composition useful in printing cellulose fibers.

5. A dye paste comprising 2-thionaphthen-2'-acenaphthylene-indigo and a hydrobenzene compound selected from the class consisting of hydrobenzene alcohols and their esters to which paste a printing gum is to be added to obtain a composition useful in printing cellulose fibers.

6. A dye paste comprising 2(5.7-dibromoindole)-5'-bromo-2'-thionaphthen-indigo and a hydrobenzene compound selected from the class consisting of hydrobenzene alcohols and their esters to which paste a printing gum is to be added to obtain a composition useful in printing cellulose fibers.

7. An aqueous paste of a thioindigoid vat dye containing a hydrobenzene compound selected from the class consisting of hydrobenzene alcohols and their esters in amount not exceeding 15 per cent the weight of said paste to which paste a printing gum is to be added to obtain a composition useful in printing cellulose fibers.

8. An aqueous paste of 5.5'-dichloro-7.7'-dimethyl-thioindigo containing a hydrobenzene compound selected from the class consisting of hydrobenzene alcohols and their esters in amount not exceeding 15 per cent the weight of said paste to which paste a printing gum is to be added to obtain a composition useful in printing cellulose fibers.

9. An aqueous paste of 2-thionaphthen-2'-acenaphthylene-indigo containing a hydrobenzene compound selected from the class consisting of hydrobenzene alcohols and their esters in amount not exceeding 15 per cent the weight of said paste to which paste a printing gum is to be added to obtain a composition useful in printing cellulose fibers.

10. An aqueous paste of 2(5.7-dibromoindole)-5'-bromo-2'-thionaphthen-indigo containing a hydrobenzene compound selected from the class consisting of hydrobenzene alcohols and their esters in amount not exceeding 15 per cent the weight of said paste to which paste a printing gum is to be added to obtain a composition useful in printing cellulose fibers.

11. A dye paste comprising a thioindigoid vat dye, a wetting agent, a dispersing agent, and a hydrobenzene compound selected from the class consisting of hydrobenzene alcohols and their esters, the latter being present in a proportion not exceeding 15 per cent by weight to which paste a printing gum is to be added to obtain a composition useful in printing cellulose fibers.

12. A dye paste comprising 5.5'-dichloro-7.7'-dimethyl-thioindigo, glycerine, a dispersing agent, and a hydrobenzene compound selected from the class consisting of hydrobenzene alcohols and their esters, the latter being present in a proportion not exceeding 15 per cent by weight to which paste a printing gum is to be added to obtain a composition useful in printing cellulose fibers.

13. A dye paste comprising 2-thionaphthen-

2'-acenaphthyleneindigo, glycerine, a dispersing agent, and a hydrobenzene compound selected from the class consisting of hydrobenzene alcohols and their esters, the latter being present in a proportion not exceeding 15 per cent by weight to which paste a printing gum is to be added to obtain a composition useful in printing cellulose fibers.

14. A dye paste comprising 2(5.7-dibromoindole)-5'-bromo-2'-thionaphthen-indigo, glycerine, a dispersing agent, and a hydrobenzene compound selected from the class consisting of hydrobenzene alcohols and their esters, the latter being present in a proportion not exceeding 15 per cent by weight to which paste a printing gum is to be added to obtain a composition useful in printing cellulose fibers.

15. A dye printing composition useful for printing cellulose fibers comprising a mixture of a thioindigoid vat dye paste containing a hydrobenzene compound selected from the class consisting of hydrobenzene alcohols and their esters, and a printing gum, said hydrobenzene compound having been incorporated with the dye paste prior to addition of the printing gum.

16. A dye printing composition useful for printing cellulose fibers comprising a mixture of a dye paste, containing 5.5'-dichloro-7.7'-dimethyl-thioindigo and a hydrobenzene compound selected from the class consisting of hydrobenzene alcohols and their esters, with a printing gum, said hydrobenzene compound having been incorporated with the dye paste prior to addition of the printing gum.

17. A dye printing composition useful for printing cellulose fibers comprising a mixture of a dye paste, containing 2-thionaphthen-2'-acenaphthylene-indigo and a hydrobenzene compound selected from the class consisting of hydrobenzene alcohols and their esters, with a printing gum, said hydrobenzene compound having been incorporated with the dye paste prior to addition of the printing gum.

18. A dye printing composition useful for printing cellulose fibers comprising a mixture of a dye paste, containing 2(5.7-dibromoindole)-5'-bromo-2'-thionaphthen-indigo and a hydrobenzene compound selected from the class consisting of hydrobenzene alcohols and their esters, with a printing gum, said hydrobenzene compound having been incorporated with the dye paste prior to addition of the printing gum.

19. A dye paste comprising a thioindigoid vat dye and pine oil to which paste a printing gum is to be added to obtain a composition useful in printing cellulose fibers.

20. A dye paste comprising a thioindigoid vat dye and cyclohexanol to which paste a printing gum is to be added to obtain a composition useful in printing cellulose fibers.

HAROLD W. WASS.
HOWARD J. RUPRIGHT.